United States Patent [19]
Fink

[11] Patent Number: 4,676,516
[45] Date of Patent: Jun. 30, 1987

[54] HIGH SPEED CHUCK ASSEMBLY

[76] Inventor: Anton Fink, 149 Crescent Dr., Searingtown, N.Y. 10507

[21] Appl. No.: 755,060

[22] Filed: Jul. 15, 1985

[51] Int. Cl.$^4$ .................. B23B 31/14; B23B 31/16
[52] U.S. Cl. ........................... 279/1 C; 279/4; 279/121
[58] Field of Search ............... 279/4, 121, 5, 6, 1 C

[56] References Cited
U.S. PATENT DOCUMENTS 4,275,892 6/1981 Rohm .................. 279/1 C
4,504,070 3/1985 Norton ................ 279/1 C Primary Examiner—Z. R. Bilinsky
Attorney, Agent, or Firm—Anthony J. Casella; Gerald E. Hespos

[57] ABSTRACT

A chuck assembly is provided for high speed operations. The chuck includes a body about which a piston is securely mounted. A cylinder and cover are slidably mounted relative to the piston and body. Master jaws are slidably disposed within the chuck body. An actuator ring surrounds the master jaws and the chuck body. The actuator ring limits deformation of the master jaws and enables a stronger chuck body that will not deform in response to centrifugal forces. Weights can be mounted in the chuck assembly to be urged against the cylinder at high rotational speeds and thereby to further prevent loosening of the chuck assembly.

12 Claims, 9 Drawing Figures

HIGH SPEED CHUCK ASSEMBLY

BACKGROUND OF THE INVENTION

Chucks are used to securely hold a tool or work piece and to rotate that tool or work piece about a central axis. More particularly, a chuck includes a plurality of jaws, each of which is movable in a radial direction relative to the rotational axis of the chuck. Typically, the chuck is securely mounted to a rotationally drivable member such as a drill or machine tool. With the machine tool in a non-rotating mode, the chuck will be activated to cause the jaws thereof to move in a radially outward direction, thereby enabling a tool or work piece to be inserted therebetween. The jaws of the chuck then are moved radially inwardly to securely grasp the tool or work piece. After the work piece, tool or the like has been securely grasped, the machine tool or drill to which the chuck is mounted can be activated, thereby causing the chuck and the work piece or tool mounted therein to rotate. This rotation enables a tool mounted in the chuck to perform work, or enables a work piece mounted therein to be appropriately machined.

Many available chucks enable a tool or work piece to be securely held at relatively low speeds. However, this low speed operation adds proportionally to the amount of time required to complete a work task. Furthermore, the low speed operation often will not generate sufficient forces to perform work on many metallic materials, and low speed operations can negatively affect the quality or smoothness of the machined surface. In many applications, such as machining of aluminum disks for video cassette recorders, a very high degree of precision is required. For example, many such disks must be accurate to within one micron of concentricity on a disk having a diameter of between three inches and five inches. This degree of precision generally is not attainable with prior art rotating machine tools that operate at low speeds. Consequently it is necessary to carry out a separate polishing or grinding step to achieve the required precision. This, of course, is quite costly, and further adds to the time required to manufacture the article.

Ceramic cutting tools and bits are available which enable a very precisely finished cut at high speeds. These ceramic cutting tools and bits are theoretically capable of providing the desired degree of accuracy without a subsequent polishing step. However, the ability of these ceramic bits to cut accurately depends upon the ability of the chuck to securely and accurately retain the rotating tool or work piece. As the chucks are rotated with increasingly rapid speed, various members of the chuck are distorted outwardly by centrifugal forces. The magnitude of these centrifugal forces increases with increasing rotational speeds. The effect of these forces is to loosen the holding power of the chuck. As a result, the rotating tool or work piece is held less securely and nonconcentric imprecise cutting results. Consequently, when the ceramic bits are used in the prior art chucks, the machining time is reduced, but accuracy is not improved appreciably. As a result, subsequent polishing operations often are required.

In addition to the loosening caused by distortion of prior art chuck members rotating at high speeds, a certain amount of loosening in the prior art chuck is caused by relative movements between chuck components. More particularly, the prior art chuck generally includes a central actuating member that moves in an axial direction in response to fluid pressure. The actuating member includes inclined channels that engage the master jaws of the chuck. The inclination of the jaw channels in the actuating members is such that as the actuating member moves rearwardly and away from the work piece, the master jaws slide generally radially inwardly to grip the tool or work piece. However, this inward motion is not purely radial. Rather, each master jaw will rotate slightly forward or toward the work piece. This rotation is due to the small but inevitable looseness of the master jaw in the channel of the actuator. Rotation of the chuck creates radially outward centrifugal forces which cause the master jaw to rotate into a more nearly radial alignment. This rearward rotation of the master jaw effectively loosens the grip on the work piece. Since the prior art chuck achieves its holding power due to the rearward forces on the actuator, there is no force to compensate for this rotation of the master jaw.

Many chucks have been developed which attempt to offset the effects of centrifugal forces at high speeds. The most typical structure for offsetting the effects of centrifugal forces includes an array of counterweights. The counterweights are pivotally mounted in the chuck such that at high speeds the heavier end of the counterweight is urged radially outwardly by centrifugal forces, while an opposing portion of the counterweight is rotated into the jaw to offset the effect of centrifugal forces. Examples of such chucks are shown in: U.S. Pat. No. 3,984,114 which issued to Ovanin on Oct. 5, 1976; U.S. Pat. No. 4,009,888 which issued to Wallace on Mar. 1, 1977; and U.S. Pat. No. 4,431,201 which issued to Morisaki on Feb. 14, 1984. A similar arrangement with counterweights acting on the central driving member of the chuck jaws is shown in U.S. Pat. No. 3,467,404 which issued to Sloan on Sept. 16, 1969. Still other devices employing springs, wedges and pawls to offset centrifugal forces are shown in U.S. Pat. No. 4,213,621 which issued to Fink et al on July 22, 1980; U.S. Pat. No. 4,213,623 which issued to Rohm on July 22, 1980; U.S. Pat. No. 4,437,675 which issued to Koenig on Mar. 20, 1984; U.S. Pat. No. 4,139,206 which issued to Knohl on Feb. 13, 1979; U. S. Pat. No. 4,139,207 which issued to Grimes on Feb. 13, 1979 and U.S. Pat. No. 4,206,932 which issued to Felker on June 10, 1980.

It is been found that these prior art chucks provide acceptable control of centrifugal forces at fairly low rotational speeds. At higher speeds, however, the prior art chucks are susceptable of being distorted with a resulting decrease in holding power and accuracy of the work performed.

Many machine tool operators have attempted to overcome the effects of centrifugal force by merely applying a higher chucking pressure. The theory is that a reduction in the radially inward holding force caused by the opposing centrifugal forces can be accepted if the initial holding forces are high. This theory may be acceptable in certain applications. However, in many applications this higher initial holding force may damage the article being held in the chuck.

It also has been found that many chucks that deform during high speed rotation will effectively elastically rebound at the termination of the high speed rotation. This elastic rebounding will cause the jaws to create a brief radially inward residual force on the work piece that exceeds the initial force exerted by the jaws. These residual forces are even more likely to damage the work piece then the initial forces exerted by the jaws.

In addition to the above described problems with high speed chucks, it is known that lubrication in high speed chucks is especially important. Automated lubricating mechanisms have been built into chucks. However, these have tended to be extremely complicated, inefficient and/or unreliable. Consequently many machine tool operators have relied upon frequent manual lubrication with even the most sophisticated chucks. Obviously, this manual lubrication is inefficient and time consuming.

In view of the above, it is an object of the subject invention to provide an improved chuck for high speed operations.

It is a further object of the subject invention to provide a simple chuck that is capable of securely retaining a tool or work piece at extremely high rotational speeds.

It is another object of the subject invention to provide a high speed chuck that does not require an unacceptably high initial griping pressure.

It is an additional of the subject invention to provide a high speed chuck that substantially avoids problems associated with elastic rebounding of the jaws at the termination of a tooling operation.

Another object of the subject invention is to provide a high speed chuck that includes a simple and reliable lubrication of the various moving parts thereof.

SUMMARY OF THE INVENTION

The chuck assembly of the subject invention includes a chuck body having a small diameter centrally aligned aperture extending therethrough. The chuck body is generally symmetrical about a longitudinal axis with the outer surface thereof defining at least one generally cylindrical surface. The rear end of the chuck body is constructed to enable mounting of the chuck to a rotatable machine tool, such that the chuck can be rotated at high speeds. The front end of the chuck body is adapted to receive radially movable master jaws. For example the front end of the chuck body may include a plurality of radially aligned jaw channels into which master jaws are slidably disposed. These channels may be T-shaped with the portion of each channel at the extreme front end of the chuck body being narrower than the portions of each channel closer to the rear end. Thus, an appropriately configured master jaw may be slidably mounted in an associated channel of the chuck body for slidable movement therein in either a radially inward or radially outward direction.

The master jaw typically performs no actual gripping function of a work piece or tool. Rather, the master jaw is adapted to receive other jaws appropriately configured for gripping a work piece.

An annular piston is mounted around the rear end of the chuck body such that relative axial movement therebetween is not possible. An annular cylinder is mounted around both the chuck body and the piston such that the cylinder can be moved axially relative to both the piston and the chuck body. An annular cover also surrounds the chuck body and is securely mounted to the cylinder such that the piston is disposed intermediate the cylinder and the cover. This secure mounting of the cover to the cylinder enables the combination of the cover and cylinder to be moved axially relative to both the chuck body and the piston.

An annular actuator ring is disposed around the front end of the chuck body generally adjacent the radially aligned master jaw channels. The inner circumferential surface of the actuator ring includes outwardly extending generally radially aligned wedging channels equal in number to the master jaw channels in the chuck body. These wedging channels in the actuator ring are formed such that the radially outward most portion of each wedging channel is larger than the radially more inward portions. Each such wedging channel is angularly aligned relative to the rotational axis of the chuck. More particularly, the portion of each wedging channel at the front or gripping end of the chuck is at a greater radial distance from the rotation axis then the portions of each wedging channel closer to the rear end of the chuck. The angular alignment of these wedging channels determines the magnitude of movement of the master jaws. In most situations, a large movement of the master jaws is not required. Consequently the angular alignment of the wedging channels can be small, and typically in the range of 5° to 10°.

A protective cover typically will be mounted around the chuck to prevent material cut from a work piece from entering the areas between the respective moving parts of the chuck.

The chuck is in communication with supplies of fluid and perferably a pneumatic fluid comprising compressed air. More particularly, the compressed air can selectively be directed into or evacuated from the areas on either side of the piston and within the enclosure formed by the cylinder and the cover. This selective flow of compressed air can cause the combination of the cylinder, the cover and the actuator ring to move in an axial direction relative to the piston, the chuck body and the master jaws. As the actuator ring moves in an axial direction relative to the master jaws, the outer most portion of each master jaw slides through the associated wedging channel in the actuator ring. However, as noted above, each wedging channel in the actuator ring is angularly aligned relative to the rotational axis of the chuck. Consequently this axial movement of the actuator ring relative to the master jaws causes the master jaws to be moved in a radial direction. The precise amount of the radial movement of the master jaws is a function of the amount of axial movement of the actuator ring plus the angular alignment of the wedging channel to the rotational axis of the chuck.

Centrifugal forces act on chucks in three ways. The first effect of centrifugal forces on a chuck is an actual deformation of the chuck body. This effect is substantially overcome by the chuck of the subject invention because the construction described herein enables a more massive chuck body that is not as likely to deform in response to centrifugal forces. Specifically, the chuck of the subject invention does not require a large central aperture for an actuator member. Consequently the central aperture can be kept much smaller. The greater mass enabled by this construction provides a more rigid chuck body that will not deform significantly.

The second component of centrifugal force includes an actual elongation of the master jaws in response to centrifugal forces. As noted above, this elongation of the master jaws affects the ability of the master jaws to securely hold a work piece. The chuck of the subject invention, however, includes an actuator ring disposed entirely around the outer circumference of the master jaws. This actuator ring contributes substantially to offsetting the effect of centrifugal forces on the radial elongation of the master jaws.

The third effect of centrifugal forces as mentioned above includes a translation of the radially outward centrifugal forces into an axial force through the interaction on the wedging surfaces of the actuator. The chuck described thus far at least partly addresses this component of centrifugal forces as well. More particularly, the actuator ring of the subject chuck is urged forwardly relative to the work piece to effect a radially inward movement of the master jaws. The wedging interaction between the wedging channels of the actuator ring and the master jaws effectively creates a radially inward force which is transmitted to the work piece. As the chuck of the subject invention is rotated, centrifugal forces are exerted on the master jaws in a radially outward direction. These centrifugal forces act upon the inclined wedging surface of the actuator ring to create a rearward component of centrifugal forces. Unlike the prior art chucks, the chuck of the subject invention directly counters each of these components of centrifugal force. Specifically, the radially outward component of the centrifugal force is countered by the radially inward component of the chucking force. Similarly, the rearward component of centrifugal forces acting through the wedging surfaces of the actuator ring is countered directly by the forward force of the actuator ring. This is in contrast to the prior art chucks where the actuator exerts an axial force in the same direction as the rearward components of centrifugal forces.

An alternate embodiment of the subject chuck further addresses the axial component of centrifugal force, thereby enabling even higher rotational speeds. More particularly, the chuck of the subject invention can be provided with an annular adapter at the rear end of the chuck. The adapter is securely mounted to the body of the chuck such that relative axial movement therebetween is prevented. The high speed adapter includes at least one weight and guide means for guiding the weight both outwardly and forward into the rear of the chuck. In one embodiment, the guide means comprises at least one angularly aligned aperture extending into the front face of the adapter. More particularly each such aperture in the high speed adapter is closer to the rotational axis of the chuck at the rear end of the adapter. A weight is slidably disposed within each aperture. The weight is configured to include a surface that is substantially perpendicular to the rotional axis of the chuck.

As the chuck is rotated centrifugal forces urge the weight outwardly and into contact with the rear end of the cylinder. Because of the angular alignment of the aperture in the high speed adapter, these centrifugal forces acting through the weight include an axial component which acts against the rear surface of the cylinder. The magnitude of this axial component increases at increased rotational speeds. Thus, the rearward component of centrifugal force acting through the wedging surface of the actuator is offset by the forward component of centrifugal force acting through the weight in the high speed adapter. As a result, this embodiment of the invention substantially offsets the one remaining component of centrifugal force that was not addressed by the previously described embodiment.

An alternate embodiment of the high speed adapter includes a flexible guide means mounted to the rear of the chuck. The flexible guide means is configured to be spaced further rearwardly from the chuck at greater readially distances from the rotational axis. The flexible guide means may be generally disc shaped, thus defining a generally convex structure. At least one weight is securely mounted to a radially outer portion of the flexible guide means. When the chuck is not rotating, the weights are spaced rearwardly from the chuck. However as the chuck rotates, centrifugal forces will urge the weights radially outwardly. These radially outward centrifugal forces will cause the outer portions of the flexible guide means and the weights secured thereto to move both outwardly and forward. Thus, the flexible guide means will assume a more nearly radially alignment. This embodiment of the high-speed adapter is constructed such that at higher, rotational speeds, the weights will be urged into the rear of the chuck. This forward force increases at higher, rotational speeds to offset the above described axial component of centrifugal forces.

The high speeds possible with the chuck of the subject invention enable machining operations to be carried out much more quickly and with a higher degree of precision. Furthermore, the chuck described herein is relatively simple and therefore reliable. To ensure that the simplicity and high speeds provided by the chuck of the subject invention are not offset by either the need to carry out time consuming manual lubrication of the jaws or by a complicated automated lubrication system, the chuck of the subject invention incorporates a simple reliable lubricating mechanism into the normal operation of the chuck. More particularly, the chuck body includes very small lubricating apertures extending to the respective jaw channels. In these relatively small apertures an even smaller nozzle can be disposed at the location where the lubricating apertures intersect the respective jaw channels. A controlled amount of lubricant can be selectively injected into the pneumatic fluid in the form of a mist. By properly locating the lubricating aperture relative to the axially movable parts of the chuck, a small amount of the lubricant containing pneumatic fluid is directed through the lubricating apertures upon each opening of the master jaws. The location of the apertures and the valves used throughout the pneumatic system ensure that no pneumatic pressure is lost during either the closing of the jaws or the operation of the chuck. Thus, the chuck achieves a simple but effective lubrication of the jaws during each opening.

DETAILED DESCRIPTION OF THE PREFERRED EMBODIMENTS

Figure 1:
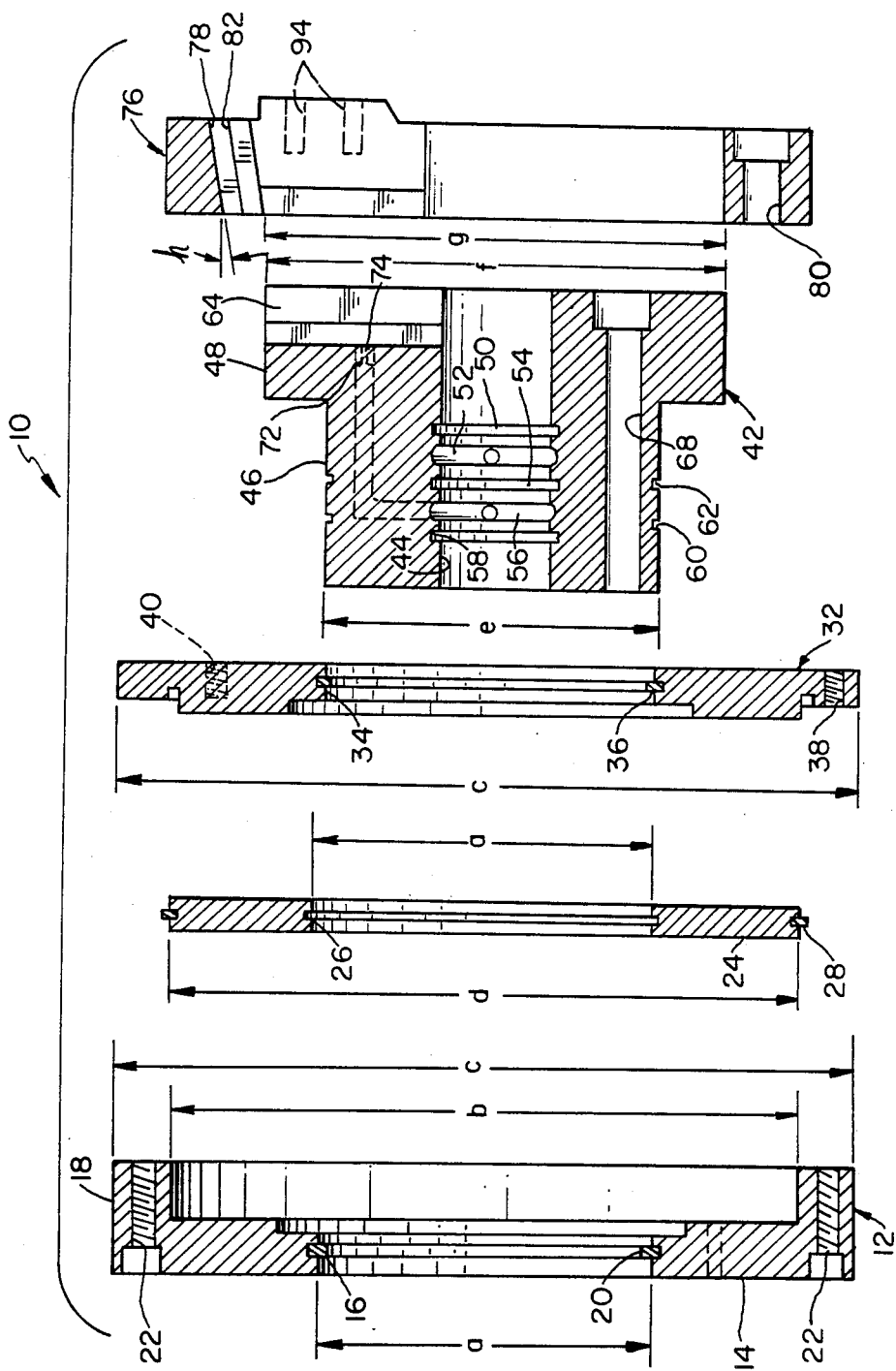
FIG. 1 is an exploded cross sectional view of the chuck of the subject invention.
Figure 2:
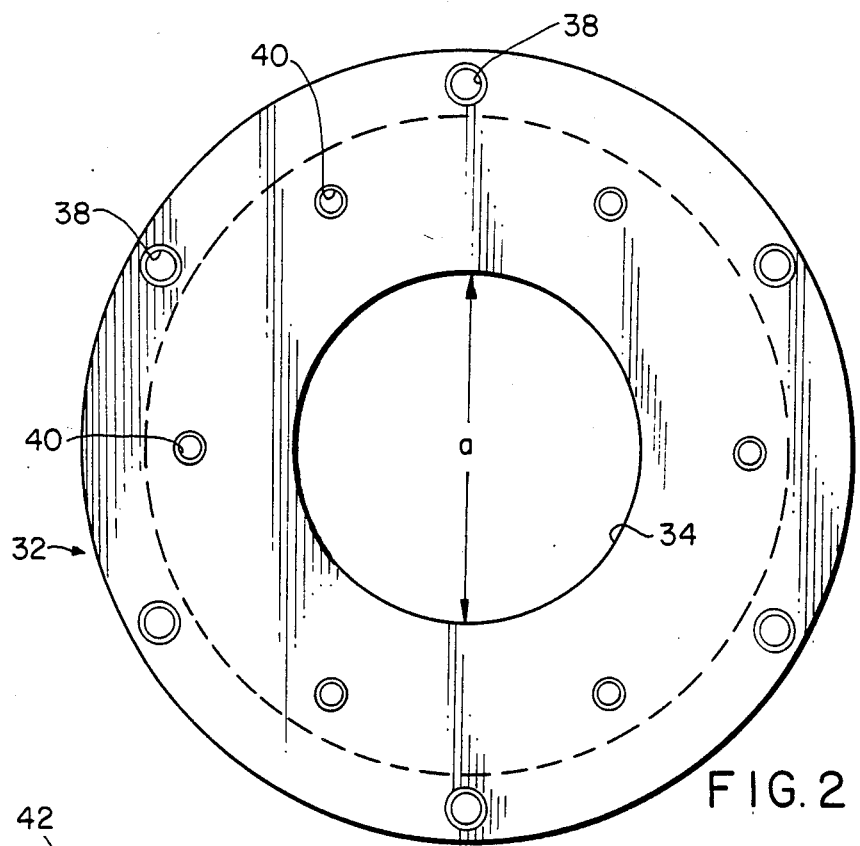
FIG. 2 is an end view of the cylinder of the chuck shown in FIG. 1.

The chuck assembly of the subject invention is indicated generally by the numeral 10 in FIG. 1. The various components of the chuck assembly 10 are illustrated in greater detail in FIGS. 2 through 5, as explained herein. As illustrated in FIG. 1, the chuck assembly 10 includes a cylinder 12 which defines the rear of the chuck assembly 10, or the part thereof that will be adjacent the machine that rotationally drives the chuck assembly 10 and any tool or work piece mounted therein. The cylinder 12 is a generally annular structure including a planar annular rear wall 14 having a central circular aperture 16 extending therethrough. An annular side wall extends orthogonally from the rear wall 14 in a forward direction. The central aperture 16 of the cylinder 12 has a diameter "a" while the annular side wall 18 defines an inner diameter "b" and an outer diameter "c" as shown in FIG. 1. A sealing rig 20 is disposed around aperture 16. Cylinder 12 further includes threaded apertures 22 which extend generally parallel to the axis of the cylinder 12 and into the annular side wall 18 thereof. The threaded apertures 22 enable the mounting of cylinder 12 to other parts of the chuck assembly 10 as explained below.

The chuck assembly 10 further includes an annular planar piston 24. The piston 24 includes a central aperture 26 having a diameter indicated by dimension "a" in FIG. 1 which is substantially equal to the diameter of aperture 16 in cylinder 12. The piston 24 has an outer diameter "d" which is slightly less than the inner diameter "b" defined by the annular side wall 18 of cylinder 12. More particularly, the outer diameter "d" of the piston 24 is approximately 0.005 inches less than the inner diameter "b" of the side wall 18 on cylinder 12. Thus, the piston 24 can be slidably moved within the annular area defined by the side wall 18 of cylinder 12. The piston 24 further includes an annular sealing ring 28 disposed around its outer circumference. The sealing ring 28 is dimensioned to provide an air tight seal between the piston 24 and the cylinder 12 when they are mounted in slidable relationship to one another.

The chuck assembly 10 further includes a generally planar annular cover 32. The cover 32 includes a central aperture 34 having diameter "a" substantially equal to the diameters of the apertures 16 and 26 in the cylinder 12 and piston 24 respectively. The central aperture 34 further includes a sealing ring 36 similar to the sealing rings 20 and 28 in the cylinder 12 and piston 24 respectively. The cover 32 has an outside diameter "c" substantially equal to the outer diameter defined by the side wall 18 of cylinder 12. The cover 32 further includes a plurality of apertures 38 which are equal in number to and alignable with the apertures 22 in the side wall 18 of cylinder 12. Thus, bolts or other such fastening means (not shown) can be used to securely mount the cover 32 to the cylinder 12. This mounting of the cover 32 to the cylinder 12 effectively defines an enclosure in which the piston 24 can slidably move. The cover 32 further includes a plurality of apertures 40 which enable the secure mounting of the various components of chuck assembly 10 to one another as explained below.

Figure 3:
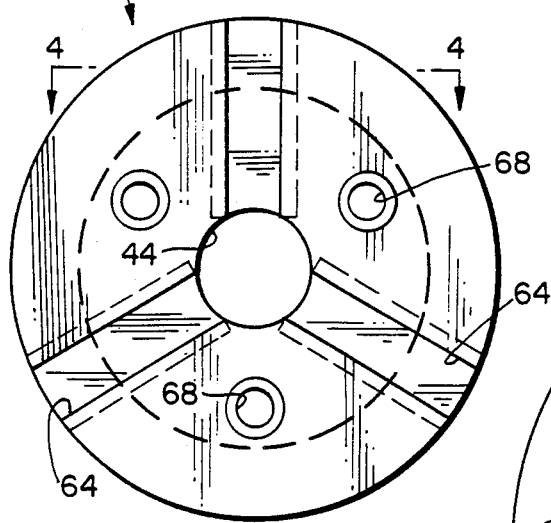
FIG. 3 is an end view of the chuck body of the chuck shown in FIG. 1.
Figure 5:
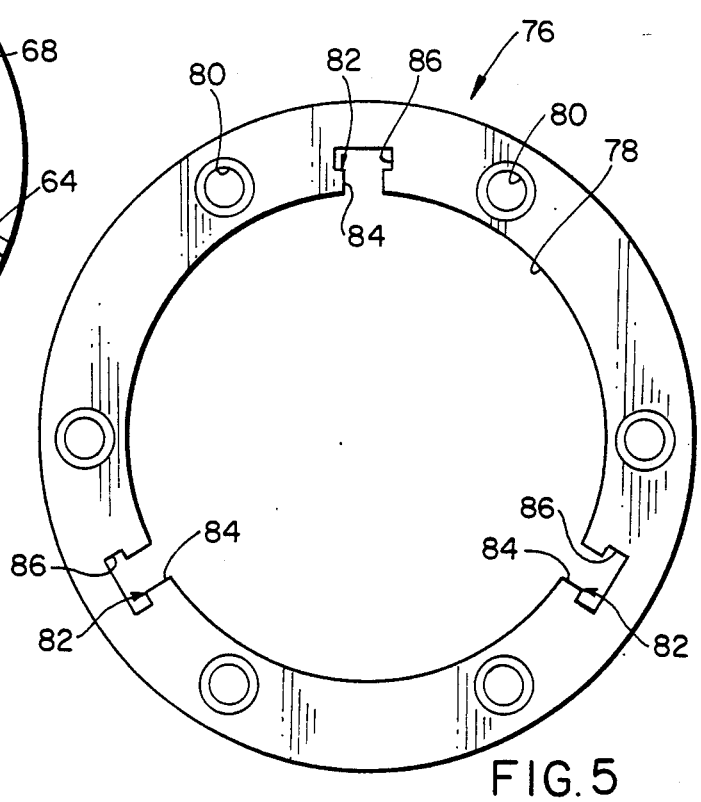
FIG. 5 is an end view of the actuator of the chuck shown in FIG. 1.
Figure 4:
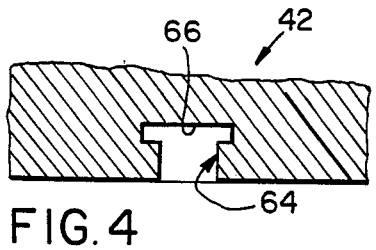
FIG. 4 is a cross sectional view taken along line 4—4 in FIG. 3.

The chuck assembly 10 further includes a body 42 as shown in FIGS. 1, 3 and 4. The body 42 includes a centrally aligned aperture 44 extending entirely therethrough. The body 42 further includes a minor diameter portion 46 and a major diameter portion 48. The minor diameter portion 46 has an outer diameter "e" which is slightly less than the inner diameter "a" defined by the apertures 16, 26 and 34 in the cylinder 12, piston 24 and cover 32 respectively. More particularly, the diameter "e" of the minor diameter portion 46 of body 42 is approximately 0.001 inch less than the diameter "a" of apertures 16, 26, and 34. As explained further below, the cylinder 12 and cover 32 are slidably mounted on the minor diameter portion 46 of the chuck body 42. The piston 24, however, is non-slidably mounted to the minor diameter portion 46 of the chuck body 42. FIG. 1 further shows that both the inner and outer circumference of the minor diameter portion 46 of the chuck body 42 include a plurality of annular grooves 50 through 62. These grooves enable the proper direction and distribution of pneumatic fluid to operate the chuck assembly 10.

The major diameter portion 48 of the chuck body 42 is provided with a plurality of radially aligned jaw channels 64. The jaws channels 64 extend from the central aperture 44 of chuck body 42 to the outer circumference thereof. As shown most clearly in FIG. 4, each jaw channel 64 is generally T-shaped in cross section. More particularly, each jaw channel 64 includes a narrow top portion at the forward end of the chuck body 42 and a wider base 66 rearwardly disposed.

The chuck body 42 further includes a plurality of axailly aligned through apertures 68 which extend entirely through both the major and minor diameter portions 46 and 48 of the chuck body 42. These apertures enable the chuck body to accept a bolt or other fastening means such that the body 42 can be mounted to the driving member of the machine tool and rotated therewith.

The chuck body 42 also includes a plurality of lubricating apertures 70 each of which is in communication with both the annular groove 56 in the central aperture 44 of chuck body 42 and in communication with the respective jaw channels 64. Each lubricating aperture 70 includes an annular bushing 72 securely mounted in the portion of lubricating aperture 70 adjacent the corresponding jaw channels 64. The annular bushing 72 includes a small central aperture 74 which is dimensioned to meter a desired amount of lubricating fluid into the jaw channel 64. The bushing 72 is provided because it is often difficult to accurately machine a small diameter aperture for a significant distance through a metalic member such as the chuck body 42. As explained herein a lubricating fluid in the form of a mist can be dispersed within the pneumatic fluid. Furthermore, the groove 56 is disposed such that a small amount of this lubricant containing pneumatic fluid is directed through the lubricating aperture 70 upon each opening of the chuck assembly 10. This construction enables an efficient automatic lubrication of the chuck assembly 10 without a separate complicated lubricating system.

The chuck assembly 10 further includes an annular actuator 76. The actuator 76 includes a central aperture 78 which defines a diameter "g" which is slightly greater than the diameter "f" of the major diameter portion 46 on chuck body 42. More particularly, the diameter "g" defined by the aperture 78 in actuator 76 is approximately 0.0002 inches greater than the diameter "f" of the major diameter portion 46 of body 42. The actuator 76 includes a plurality of through apertures 80 which are equal in number to and aligned with the apertures 40 in cover 32. Thus, the actuator 76 can be securely mounted to the cover 32.

The actuator 76 further includes a plurality of wedging channels 82 which are equal in number to and in alignment with the jaw channels 64. Each wedging channel 82 is angularly aligned relative to the rotational axis of the chuck assembly 10 such that the respective wedging channels 82 are disposed at greater radial distances from the rotational axis at locations on the actuator 76 closest to the forward end of the chuck assembly 10. Preferably, as shown in FIG. 1, this angular alignment, as indicated by angle "h" is approximately equal to 7°. Each wedging channel 82 includes a narrow portion 84 at the radially inner most point thereon and a wider portion 86 at the radially outer end thereof.

The chuck assembly 10 further includes a plurality of master jaws 88. Each master jaw 88 includes a generally T-shaped rail 90 that is dimensioned to be slidably disposed within one said jaw channel 64. Each master jaw further includes a generally T-shaped wedge 92 at the radially outer most point thereof. The T-shaped wedge 92 is dimensioned and angularly aligned to be slidably mounted in one said wedging channel 82 of actuator 76. The master jaw 88 further includes mounting means 94 which enable the mounting of a particular gripping jaw thereto for holding an appropriate work piece.

Figure 6:
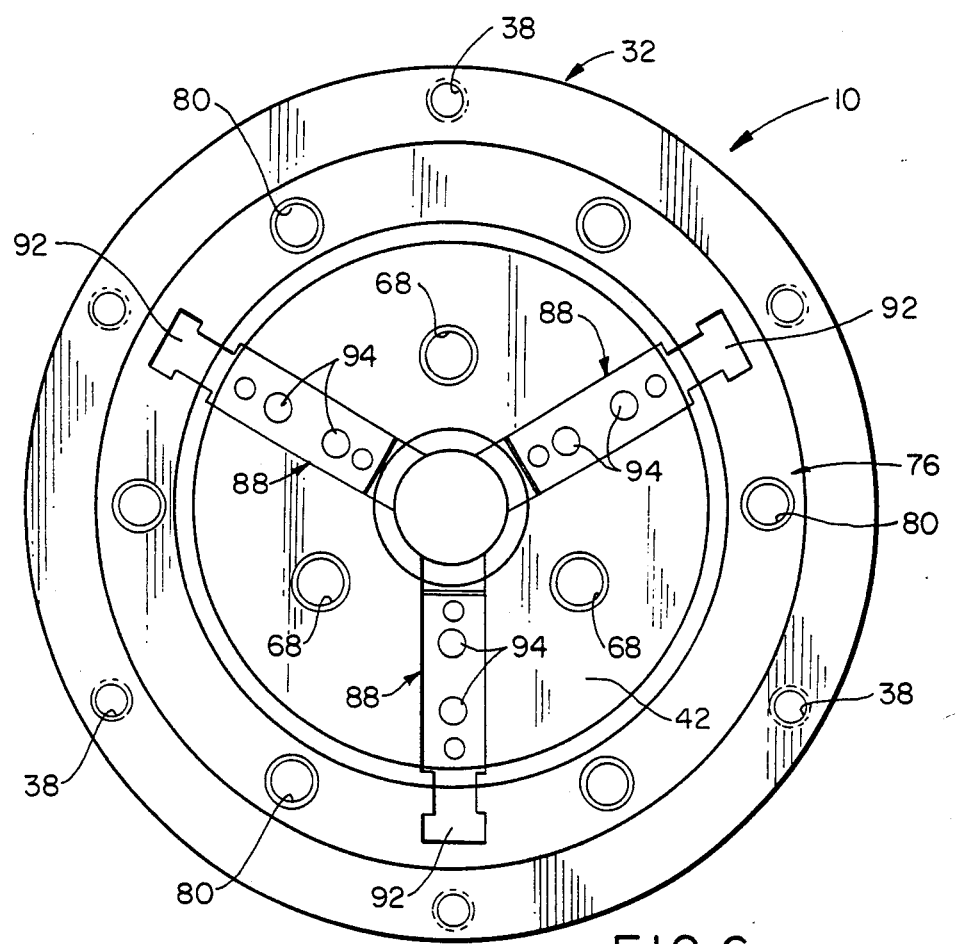
FIG. 6 is an end view of the assembled chuck.
Figure 8:
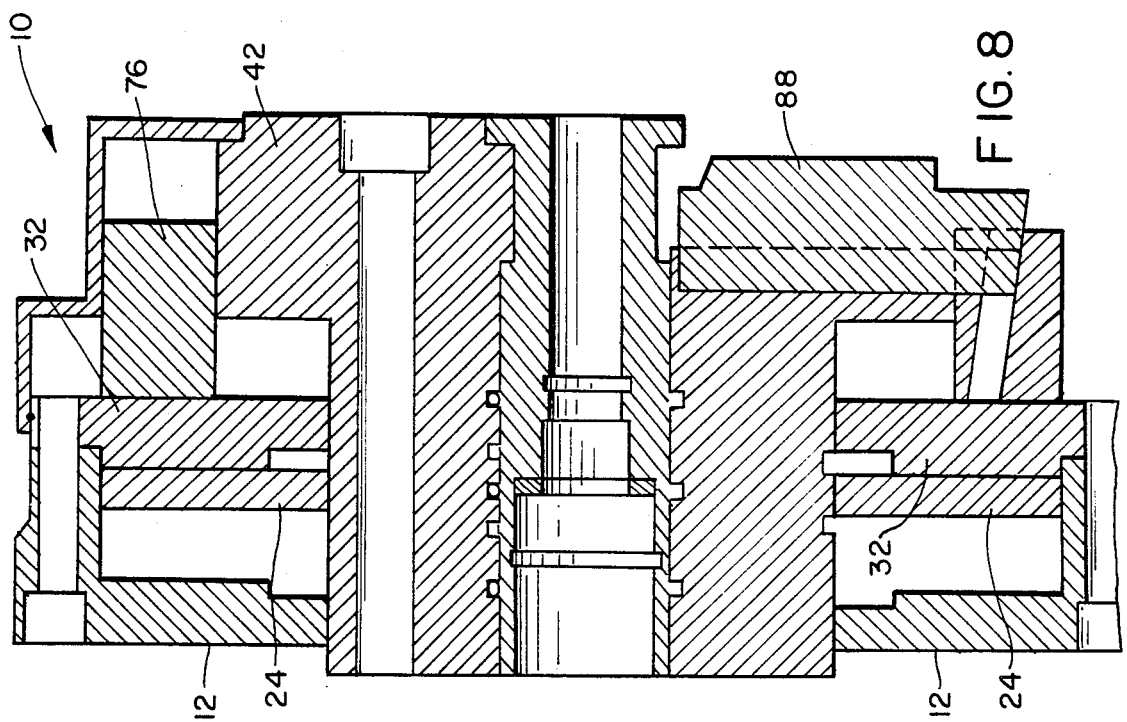
FIG. 8 is a cross sectional view similar to FIG. 7 but with the jaws urged radially outwardly.
Figure 7:
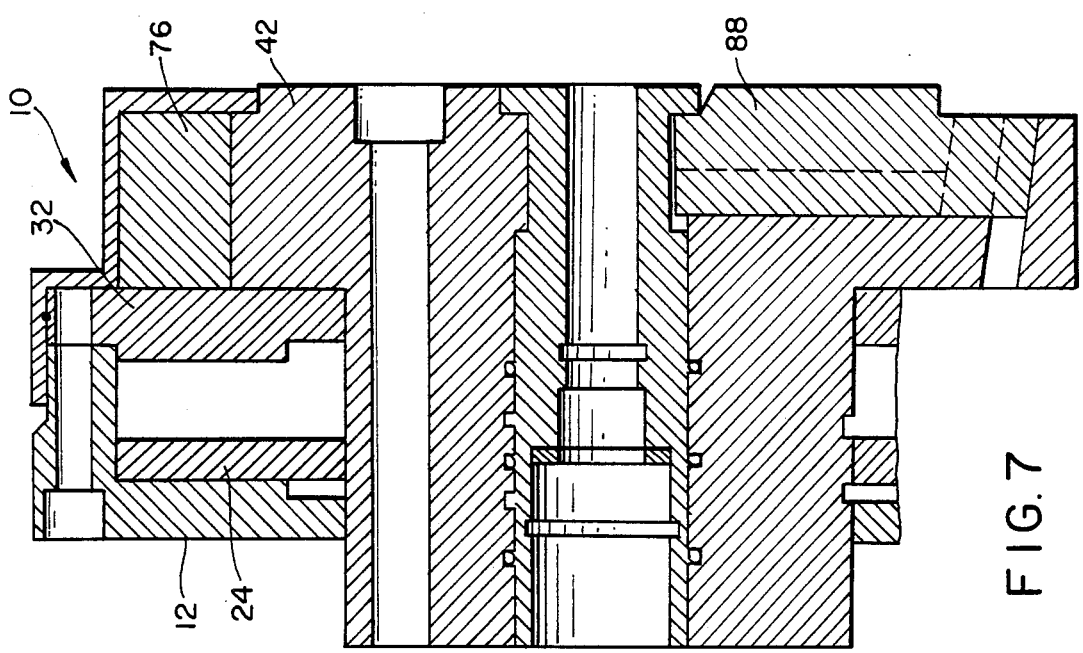
FIG. 7 is a cross sectional view of the chuck with the jaws urged radially inwardly.

The components of the chuck assembly 10 are assembled as shown in FIGS. 6 through 8. More particularly, the cylinder 12, piston 24 and cover 32 are concentrically mounted to the minor diameter portion 46 of the chuck housing 42. More particularly, the piston 24 is securely mounted to the chuck body 42 but is slidably disposed relative to the cylinder 12 and the cover 32. The cylinder 12 and the cover 32 also are movable relative to the chuck body 42.

The master jaws 88 are slidably mounted within the jaw channels 64 of the chuck body 42. Thus, each master jaw 88 is able to move inwardly or outwardly in a radial direction. The actuator ring 76 is slidably disposed around the major diameter portion 48 of the chuck 42. The actuator ring 76 is securely mounted to the cover 32 such that the cylinder 12, the cover 32 and the actuator ring 76 move in unison relative to the chuck body 42. The wedging channels 82 of the actuator ring 76 are in slidable engagement with the wedges 92 of the master jaws 88. Thus, the actuator ring 76 circumferentially surrounds the master jaws 88 to limit and control the radial movement of the master jaws 88 and prevent radial elongation of the master jaws 88 in response to centrifugal forces.

As shown in FIG. 7, the piston 24 is disposed substantially in contact with the rear wall 14 of the cylinder 12. Conversely, the piston 24 is spaced axially from the cover 32. This relative positioning of the components of chuck assembly 10 is acheived by directing pressurized air into the space between piston 24 and cover 32, while simultaneously evacuating air from the space intermediate the cylinder 12 and the piston 24. As noted above, the piston 24 is stationary relative to the body 42. Thus, the direction of forced air forward of piston 24 causes the cylinder 12, the cover 32 and the actuator ring 76 to move forward relative to piston 24 and body 42. This forward movement brings the cover 32 directly into contact with the major diameter portion 46 of the body 42. As the actuator ring 76 moves forward, the angularly aligned wedging channels 82 thereof are urged into the respective wedges 92 of the master jaws 88. The master jaws 88, however, are prevented from moving in an axial direction by the interengagement of the T-shaped rails 90 with the T-shaped jaw channels 64. Thus, as the actuator ring 76 moves forward, there is slidable movement between the wedging channels 82 thereof and the wedges 92 of the corresponding master jaws 88. However, the angular alignment of the wedging channel 82 causes the master jaw 88 to slide radially inwardly through its respective jaw channel 64. This inward movement of the master jaws 88 enables the chuck assembly 10 to securely retain a work piece.

FIG. 8 shows the chuck assembly 10 in an open mode. More particularly, the master jaws 88 are disposed radially outwardly relative to the position shown in FIG. 7. This radially outward movement of the master jaws 88 is achieved by reversing the relative flows of pneumatic fluid described above. More particularly, pressurized air is directed between the piston 24 and the cylinder 12 and is simultaneously evacuated from the area between piston 24 and cover 32. As noted above, the piston 24 is immovable relative to the chuck body 42. Thus the above described flow of pressurized air causes the cylinder 12, the cover 32 and the actuator ring 76 to move rearwardly relative to the piston 24 and the chuck body 42. The rearward movement of the actuator ring 76 causes a slidable movement between the wedging channels 82 and the corresponding wedges 92 of the master jaws 88. However, in view of the angular alignment of the wedging channels 82, the master jaws 88 slidably move in a radially outward direction through the respective jaw channels 64 in the chuck body 42. This outward movement of the master jaws 88 enables a work piece to be inserted in or removed from the chuck assembly 10.

As explained in the preceding paragraphs, the actuation of the master jaws 88 is achieved by the actuator ring 76 which surrounds both the master jaws 88 and the chuck body 42. This is in contrast to most prior art chucks which activate the master jaws from locations disposed either inwardly thereto or intermediate the inner and outer extremes of the master jaws. The unique construction of the chuck assembly 10 enables two positive results for high speed operations. First, the chuck body does not include large central voids to accomodate the movement of an inwardly disposed actuator. Thus, the chuck body 42 described and illustrated above is relatively massive and stronger than prior art chuck bodies, and consequently is better able to resist centrifugal forces that would otherwise reduce the holding power of the chuck. Second, the actuator ring 76 concentrically surrounds and securely retains the master jaws 88. Thus, the master jaws 88 are restrained from an elongation in response to centrifugal force. As noted above, this elongation of the master jaws in the prior art chucks resulted in reduced holding power at high rotational speeds. Furthermore, since the chuck body 42 does not deform significantly there are virtually no residual forces occuring when the chuck is stopped. As noted above, this had been a significant problem with prior art chucks that had effectively elastically rebounded to create forces greater than those initially applied when rotation was stopped and thereby damaging many work pieces. Additionally, the forward forces exerted by the actuator ring and the indicated angular alignment of the wedging channels directly and at least partly counteract the radially outward and rearward components of centrifugal force.

The chuck of the subject invention was compared to chucks having a conventional actuators which act either through the center of the chuck body or at a point intermediate the radial length of the master jaws. These prior art chucks were reduced to 40% of their initial holding power at 4,000 r.p.m. and at a 30 p.s.i. pressure exerted by the piston. At 5,000 r.p.m. and 30 p.s.i. the prior art chucks deformed so much as to effectively fail. On the other hand, the chuck of the subject invention had no appreciable loss in holding power at 5,000 r.p.m. and 30 p.s.i. The chuck of the subject invention was then tested at 8,000 r.p.m. With 20 p.s.i. holding pressure and at 8,000 r.p.m. the chuck of the subject invention retained 50% of its initial holding force. At the same 8,000 r.p.m. rotational speed and 30 p.s.i. the chuck retained 55% of its initial holding power. Finally, at the same 8,000 revolutions per minute and 40 p.s.i the subject chuck retained 70% of its initial holding power. As noted above, it often is desirable to keep the holding pressure low to avoid deforming the work piece. Also a loss in holding power of greater than 50% is generally unaccepted. From the above described tests, it can be seen that at a low initial holding force of 20 p.s.i., which is suitable for most potentially damagable work pieces, the subject chuck can be rotated at 8,000 r.p.m. with a loss in holding power that is within tolerable limits. Since most work pieces can tolerate holding forces greater than those achieved at 20 p.s.i., the chuck of the subject invention clearly achieves acceptable holding power at rotional speeds as high as 8,000 r.p.m.

As noted above, the chuck described and illustrated with reference to FIGS. 6 through 8 accounts for only two of the three most significant effects of centrifugal force. The axial component of centrifugal force which is present due to the angular alignment of the wedges and wedging channels is not addressed by the embodiment of the invention illustrated in FIGS. 6 through 8. However, FIG. 9 illustrates an alternate embodiment that is specifically adapted to address this axial component of centrifugal force.

Figure 9:
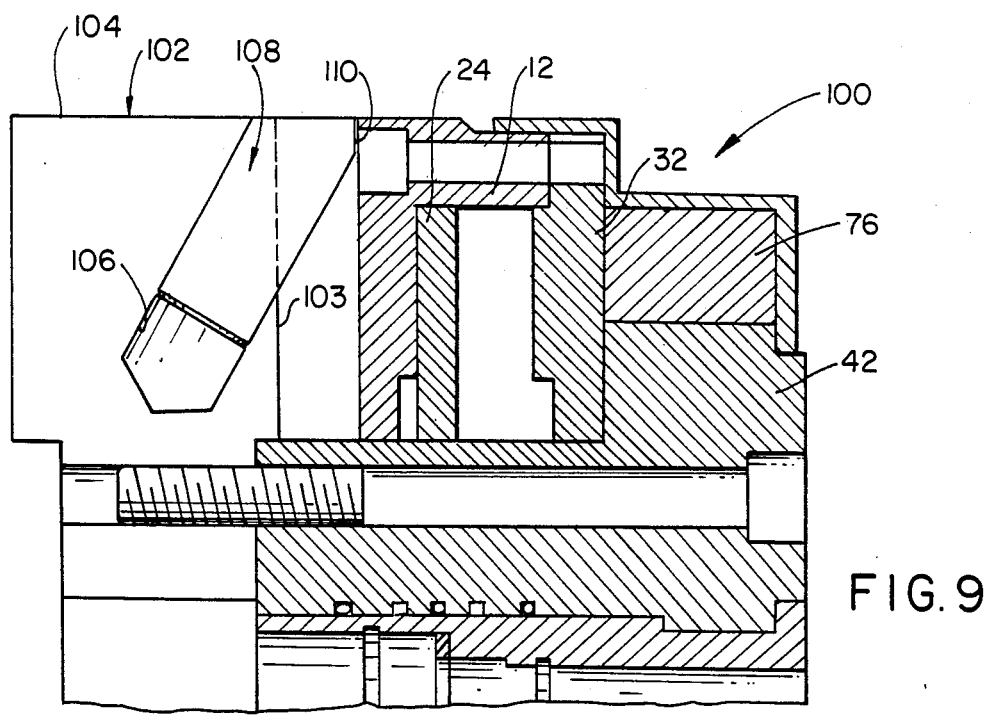
FIG. 9. is a cross sectional view of an alternate embodiment of the chuck of the subject invention.

The chuck 100 shown in FIG. 9 is similar to the chuck shown in FIG. 7 and identical numbers have been used for the similar parts. However, in addition to the components illustrated in FIGS. 6-8 the chuck assembly 100 in FIG. 9 includes an adapter 102 that is mounted rearwardly of the cylinder 12. More particularly, the adapter 102 includes a front surface 103 that is disposed in face to face contact with the rear wall 14 of the cylinder 12. The adapter 102 further includes an outer circumferential surface 104. At least one aperture 106 extends angularly into the adapter 103 such that the aperture 106 intersects the front surface 102 adjacent the outer circumferential surface 104.

A weight 108 is slidably mounted in the aperture 106. More particularly, the weight 108 can slidably move within the aperture 106, but is prevented from being removed entirely therefrom by the cylinder 12. The weight 108 includes a wedging face 110 which is aligned parallel to the rear wall 14 of the cylinder 12 and perpendicular to the axis of the chuck assembly. As the chuck assembly 100 is rotated, the centrifugal forces urge the weight 108 in a radially outward and forward direction such that the wedging face 110 thereof is urged against the rear wall 14 of cylinder 12. The forces exerted by the wedging face 110 of weight 108 are proportional to the centrifugal forces on weight 108, which in turn are proportional to the rotational speeds of the chuck assembly 100. Thus, weight 108 effectively prevents the cylinder 12, the cover 32 and the actuator 76 from moving rearwardly. Thus, the alternate embodiment of the invention, as illustrated in FIG. 9, effectively offsets the axial component of centrifugal force described above. Preliminary analyses of the embodiment illustrated in FIG. 9 indicates that rotational speeds as high as 12,000-15,000 r.p.m. are obtainable with losses of holding force that are well within acceptable limits. Thus, the chuck assembly 100 will enable extreme precision to be achieved very quickly.

In summary, a chuck assembly is provided with a piston securely mounted to a chuck body and slidably disposed relative to a cylinder and cover. The cylinder and cover are movably mounted relative to the chuck body. An actuator ring concentrically surrounds the forward most portion of the chuck body. Master jaws are slidably disposed in radially aligned channels in the forward end of the chuck body. The master jaws further include angularly aligned wedges at the radially outer most portions thereof. These wedges are slidably engaged by angularly aligned wedging channels in the actuator ring. An appropriate application of pneumatic fluid to either side of the piston causes the cylinder, cover and actuator ring to move axially relative thereto. This axial movement of the ring will cause a corresponding inward or outward movement of the master jaws by virtue of the wedging action therebetween. The concentric mounting of the actuator ring around the chuck body and the master jaws effectively holds the master jaws and prevents elongation thereof. Furthermore, the chuck body can be made substantially more solid than prior art chuck bodies to offset the effects of centrifugal forces thereon. The chuck assembly can further offset centrifugal forces with an adapter at the rearward portion thereof. The adapter includes an angularly aligned aperture in which a weight is slidably disposed. At high rotational speeds the weight is urged into the cylinder to prevent axial movement thereof.

While the invention has been described with respect to certain preferred embodiments, it is obvious that various changes and modifications can be made without departing from the scope of the invention which should be limited only by the apended claims.

What is claimed is:

1. A chuck assembly comprising:
   a chuck body having opposed front and rear ends and a longitudinal axis extending therebetween, said chuck body being generally symmetrically disposed relative to said longitudinal axis;
   a plurality of master jaws radially disposed relative to the longitudinal axis of said chuck body and slidably mounted to the front end of said chuck body such that each said master jaw is slidably movable in a radial direction toward and away from the longitudinal axis of said chuck body, each said master jaw including an angularly aligned wedge at the radially outer most portion thereof;
   an annular actuator ring concentrically surrounding said chuck body and said master jaws and axially movable relative thereto, said actuator ring comprising at least one wedge surface angularly aligned to said longitudinal axis and in slidable communication with the respective wedges of said master jaws; and
   an annular piston surrounding said chuck body and securely mounted thereto and an annular cylinder surrounding said chuck body and said piston and longitudinally movable relative thereto, said annular cylinder being fixedly mounted to said actuator ring for moving said actuator ring in an axial direction and causing the wedging surface thereof to move the master jaws in a radial direction, whereby the concentric disposition of said actuator ring around said chuck body and around said master jaws reduces distortion of said chuck body and said master jaws due to centrifugal forces thereon and whereby the annular cylinder and the actuator ring resist axial movement caused by centrifugal forces acting on the wedging surface of said actuator ring.

2. A chuck assembly as in claim 1 wherein the actuator ring includes a plurality of wedging surfaces equal in number to the plurality of master jaws, said wedging surfaces being aligned respectively with said master jaws.

3. A chuck assembly as in claim 2 wherein each said wedging surface defines a wedging channel extending radially outwardly into said actuator ring, said wedging channels engaging the respective radially outer most portions of said master jaws.

4. A chuck assembly as in claim 3 wherein each said wedging channel and each said wedge is generally T-shaped in cross section.

5. A chuck assembly as in claim as in 1 wherein the piston and cylinder assembly is pneumatically operable.

6. A chuck assembly as in claim 1 further comprising an adapter mounted rearwardly of said actuator ring, said adapter including at least one aperture angularly aligned to the longitudinal axis thereof, said adapter including a weight slidably disposed within said aperture such that rotation of said chuck causes a radially outward movement of said weight in said aperture, said weight being disposed such that in the radially outward position thereof said weight prevents axial movement of said actuator ring relative to said chuck body.

7. A chuck assembly as in claim 1 further comprising an adapter mounted rearwardly of said actuator ring, said adapter comprising at least one weight and guide means for guiding the weight radially outwardly and forwardly, whereby rotation of said chuck assembly causes the weight to be urged forwardly toward said actuator ring.

8. A chuck assembly as in claim 1 wherein said chuck body includes a plurality of radially aligned jaw channels, said master jaws being slidably disposed respectively in said radially aligned jaw channels.

9. A chuck assembly as in claim 8 further comprising means for lubricating said radially aligned jaw channels in said chuck body.

10. A chuck assembly as in claim 9 wherein said chuck body includes a plurality of lubricating apertures extending respectively to the radially aligned jaw channels whereby a lubricant can be directed to said jaw channels through the respective lubricating apertures.

11. A chuck assembly as in claim 1 wherein the chuck body inclues a centrally aligned aperture extending longitudinally therethrough said centrally aligned aperture being in communication with a source of pneumatic fluid for operating the piston and cylinder assembly.

12. A chuck assembly as in claim 11 wherein the chuck body further comprises a plurality of radially aligned jaw channels at the front end thereof, said master jaws being slidably mounted in the respective jaw channels of said chuck body, said body further comprising a plurality of lubricating apertures extending from the jaw channels thereof to the central aperture of said chuck body.

* * * * *